United States Patent
Chauveau et al.

(10) Patent No.: US 10,615,405 B2
(45) Date of Patent: Apr. 7, 2020

(54) ELECTRODES OF LI-ION BATTERIES WITH IMPROVED CONDUCTIVITY

(71) Applicant: Arkema France, Colombes (FR)

(72) Inventors: Jérôme Chauveau, Evreux (FR); Grégory Schmidt, Mormant (FR); Stéphane Bizet, Barc (FR)

(73) Assignee: Arkema France, Colombes (FR)

( * ) Notice: Subject to any disclaimer, the term of this patent is extended or adjusted under 35 U.S.C. 154(b) by 29 days.

(21) Appl. No.: 15/554,571

(22) PCT Filed: Mar. 3, 2016

(86) PCT No.: PCT/FR2016/050481
§ 371 (c)(1),
(2) Date: Aug. 30, 2017

(87) PCT Pub. No.: WO2016/139426
PCT Pub. Date: Sep. 9, 2016

(65) Prior Publication Data
US 2018/0076444 A1  Mar. 15, 2018

(30) Foreign Application Priority Data

Mar. 3, 2015 (FR) .................................... 15 51763

(51) Int. Cl.
| | | |
|---|---|---|
| *H01M 10/0525* | (2010.01) | |
| *H01M 4/62* | (2006.01) | |
| *H01M 4/131* | (2010.01) | |
| *H01M 4/1391* | (2010.01) | |
| *H01M 4/136* | (2010.01) | |

(52) U.S. Cl.
CPC ......... *H01M 4/131* (2013.01); *H01M 4/1391* (2013.01); *H01M 4/62* (2013.01); *H01M 4/623* (2013.01); *H01M 4/625* (2013.01); *H01M 10/0525* (2013.01); *H01M 4/136* (2013.01)

(58) Field of Classification Search
CPC .... H01M 4/131; H01M 10/0525; H01M 4/62; H01M 4/1391; H01M 4/623; H01M 4/625; H01M 4/136
See application file for complete search history.

(56) References Cited

U.S. PATENT DOCUMENTS

| | | | |
|---|---|---|---|
| 2004/0121234 A1 | 6/2004 | Le | |
| 2005/0221185 A1* | 10/2005 | Sakata | H01M 4/133 429/231.8 |
| 2008/0241705 A1* | 10/2008 | Wakita | H01M 4/0404 429/344 |
| 2009/0286163 A1 | 11/2009 | Shin et al. | |
| 2011/0053004 A1* | 3/2011 | Saruwatari | H01M 4/131 429/342 |
| 2011/0143196 A1 | 6/2011 | Okumura et al. | |
| 2011/0229769 A1* | 9/2011 | Ihara | H01M 10/0525 429/325 |
| 2011/0311884 A1* | 12/2011 | Armand | B22F 9/24 429/336 |
| 2012/0028117 A1 | 2/2012 | Plee et al. | |
| 2014/0315079 A1* | 10/2014 | Schmidt | C07D 233/90 429/188 |
| 2015/0315155 A1* | 11/2015 | Armand | B22F 9/24 546/272.7 |
| 2017/0352873 A1* | 12/2017 | Korzhenko | H01M 4/364 |

FOREIGN PATENT DOCUMENTS

| | | | |
|---|---|---|---|
| JP | 2014086354 | * | 5/2014 |
| WO | WO 2013092446 | * | 1/2013 |

OTHER PUBLICATIONS

Abusleme et all (15th International meeting on Lithium batteries, Abstract # 707, 2010 (Year: 2010).*
JP2014086354 MT (Year: 2014).*

* cited by examiner

*Primary Examiner* — Alexander Usyatinsky
(74) *Attorney, Agent, or Firm* — Joanne Rossi

(57) ABSTRACT

The invention relates to the field of storing electrical energy in secondary lithium batteries of the Li-ion type. More precisely, the invention relates to an electrode material for a Li-ion battery, to the method for the production thereof, and to the use of same in a Li-ion battery. The invention also relates to Li-ion batteries produced using said electrode material.

15 Claims, No Drawings

ELECTRODES OF LI-ION BATTERIES WITH IMPROVED CONDUCTIVITY

This application claims benefit, under U.S.C. § 119 or § 365 of PCT Application Number PCT/FR2016/050481, filed Mar. 3, 2016, and French Patent Application Number FR1551763, filed Mar. 3, 2015, these documents being incorporated herein by reference.

FIELD OF THE INVENTION

The present invention relates generally to the field of electrical energy storage in the lithium storage batteries of Li-ion type. More specifically, the invention relates to a Li-ion battery electrode material, to its method of preparation and to its use in a Li-ion battery. Another subject matter of the invention is the Li-ion batteries manufactured by incorporating this electrode material.

TECHNICAL BACKGROUND

An elementary cell of a Li-ion storage battery or lithium battery comprises an anode (at discharge), generally made of lithium metal or based on carbon, and a cathode (likewise at discharge), generally made of a lithium insertion compound of metal oxide type, such as $LiMn_2O_4$, $LiCoO_2$ or $LiNiO_2$, between which is inserted an electrolyte which conducts lithium ions.

A cathode or an anode generally comprises at least one current collector on which is deposited a composite material which consists of: one or more "active" materials, active because they exhibit an electrochemical activity with respect to lithium, one or more polymers which act as binder and which are generally functionalized or nonfunctionalized fluoropolymers, such as polyvinylidene fluoride, or aqueous-based polymers of carboxymethylcellulose type or styrene/butadiene latexes, plus one or more electron-conducting additives which are generally allotropic forms of carbon.

The conventional active materials at the negative electrode are generally lithium metal, graphite, silicon/carbon composites, silicon, fluorographites of $CF_x$ type with x between 0 and 1, and titanates of $LiTi_5O_{12}$ type.

The conventional active materials at the positive electrode are generally of the $LiMO_2$ type, of the $LiMPO_4$ type, of the $Li_2MPO_3F$ type, of the $Li_2MSiO_4$ type, where M is Co, Ni, Mn, Fe or a combination of these, of the $LiMn_2O_4$ type or of the $S_8$ type.

Recently, additives which make it possible to improve the permeability of the electrolyte to the core of the electrode have been used. As a result of the growing demand for high-energy batteries, that is to say batteries with higher electric storage capacities, the thickness of the electrodes is increasing and thus the permeability of the electrolyte is becoming important in the overall resistance of the battery. With the aim of improving this permeability, the document WO2005/011044 describes the addition of "inorganic" fillers of metal oxides, such as $Al_2O_3$ and $SiO_2$. These inorganic fillers are added during the conventional process for the manufacture of electrodes. This conventional process consists in mixing the different constituents in a solvent or a mixture of solvents, such as, for example, N-methylpyrrolidone, acetone, water or ethylene carbonate:

1. at least one conducting additive at a content ranging from 1 to 5% by weight, preferably from 1.5 to 4% or 1 to 2.5% by weight, preferably from 1.5 to 2.2% by weight, with respect to the total weight of the composite material;
2. a lithium oxide, phosphate, fluorophosphate or silicate as electrode active material capable of reversibly forming an insertion compound with lithium, having an electrochemical potential greater than 2V with respect to the $Li/Li^+$ pair;
3. a polymer binder.

The ink obtained is subsequently coated onto the current collector and the solvent or solvents are evaporated by heating ranging from 30 to 200° C.

The failings of these inorganic fillers are that they decrease the amount of active material in the electrode and thus the capacity of the battery but also these fillers only make it possible to improve the macroscopic diffusion of the electrolyte.

In point of fact, in the electrode, it is the charging resistance of the active material/electrolyte interface which is limiting for the performance of the battery. This resistance is a microscopic effect which cannot be improved by the addition of macroscopic inorganic filler.

The applicant has discovered that the addition of a salt consisting of an organic anion, chosen in order to have a favorable interaction at the surface of the active material, makes it possible to increase the ionic conductivity of the electrode.

Furthermore, an improvement in the cohesion and adhesion properties of the electrode on metal by the specific choice of the polymer binder has been looked for.

SUMMARY OF THE INVENTION

The invention relates to an electrode composition, characterized by the simultaneous presence of a high-performance fluoropolymer binder capable of ensuring good cohesion and adhesion properties at a low content in the cathode and of a specific organic salt which improves the ionic conductivity of the electrode.

The invention relates first to the use of organic salts as ionic conductivity additives in the formulation of electrodes of Li-ion storage batteries, preferably in the cathode formulation. These salts can also be used in the formulation of electrodes of Na-ion batteries.

Another subject matter of the invention is the use of said formulation as battery electrode.

The ion-conducting additive has to be capable of withstanding the conditions of the process for the preparation of the electrodes described above. For example, $LiPF_6$, the lithium salt currently used in the majority of the electrolytes, due to its temperature instability and instability toward nucleophilic solvents, cannot be used as ionic conductivity additive.

The invention also relates to a Li-ion battery electrode composite material, preferably a positive electrode material, comprising:

a) at least one electron-conducting additive at a content ranging from 1 to 5% by weight, preferably from 1.5 to 4% or from 1 to 2.5% by weight, preferably from 1.5 to 2.2% by weight, with respect to the total weight of the composite material;

b) a lithium oxide, phosphate, fluorophosphate or silicate as electrode active material capable of reversibly forming an insertion compound with lithium, having an electrochemical potential of greater than 2V with respect to the $Li/Li^+$ pair;

c) a polymer binder;

d) at least one organic salt of formula A and/or B, (A)

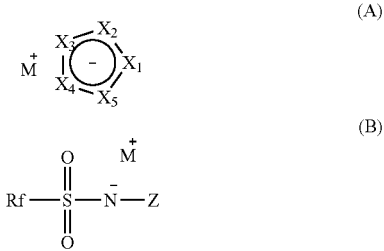

(B)

$$Rf-\underset{\underset{O}{\|}}{\overset{\overset{O}{\|}}{S}}-\overset{\overset{+}{M}}{N}-Z$$

In the formula (A), —Xi- independently represents the following groups or atoms: —N=, —N⁻—, —C(R)=, —C⁻(R)—, —O—, —S(=O)(R)= or —S(R)= and R represents a group chosen from F, CN, $NO_2$, S—CN, N=C=S, —$OC_nH_mF_p$, —$C_nH_mF_p$ with n, m and p integers. The compounds of formula (A) which are particularly preferred are the imidazolates represented below and advantageously lithium imidazolates:

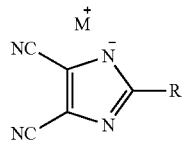

where R represents F or —$C_nH_mF_p$. These lithium salts are particularly advantageous due to their insensitivity to water, which makes possible simplified use in the process for the preparation of the electrode.

In the formula (B), $R_f$ represents F, $CF_3$, $CHF_2$, $CH_2F$, $C_2HF_4$, $C_2H_2F_4$, $C_2H_3F_2$, $C_2F_5$, $C_3F_6$, $C_3H_2F_5$, $C_3H_4F_3$, $C_4F_9$, $C_4H_2F_7$, $C_4H_4F_5$, $C_5F_{11}$, $C_3F_5OCF_3$, $C_2F_4OCF_3$, $C_2H_2F_2OCF_3$ or $CF_2OCF_3$ and Z represents an electron-withdrawing group chosen from F, CN, $SO_2R_f$, $CO_2R_f$ or $COR_f$.

In the general formulae above, M⁺ represents a lithium cation, a sodium cation, a quaternary ammonium or an imidazolium. Preferably, M⁺ represents a lithium cation or a sodium cation.

Preferably, the constituent (d) can vary between 0.01 and 10% and advantageously from 0.05 to 5% by weight, with respect to the total weight of the material.

The electron-conducting additive is preferably chosen from the different allotropic forms of carbon or conducting organic polymers.

Characteristically, the polymer binder is chosen from fluoropolymer binders of high molecular weight and/or which carry functional group(s) capable of developing adhesion to a metal substrate and good cohesion of the material making up the electrode.

According to one embodiment, said binder is a fluoropolymer of high molecular weight, preferably a fluoropolymer of very high molecular weight. The fluoropolymers are chosen from vinylidene fluoride and chlorotrifluoroethylene copolymers, and poly(vinylidene fluoride).

Preference is given, among these, to poly(vinylidene fluoride) or PVDF having a melt viscosity of greater than or equal to 2000 Pa·s at 232° C. under shearing of 100 s⁻¹. The viscosity is measured at 232° C., at a shear gradient of 100 s⁻¹, using a capillary rheometer or a parallel-plate rheometer, according to the standard ASTM D3825. The two methods give similar results.

The term "PVDF" employed here comprises vinylidene fluoride (VDF) homopolymers or copolymers of VDF and of at least one other comonomer in which the VDF represents at least 50 mol %. The comonomers which can be polymerized with VDF are chosen from vinyl fluoride, trifluoroethylene, chlorotrifluoroethylene (CTFE), 1,2-difluoroethylene, tetrafluoroethylene (TFE), hexafluoropropylene (HFP), perfluoro(alkyl vinyl) ethers, such as perfluoro(methyl vinyl) ether (PMVE), perfluoro(ethyl vinyl) ether (PEVE) or perfluoro(propyl vinyl) ether (PPVE), perfluoro(1,3-dioxole), perfluoro(2,2-dimethyl-1,3-dioxole) (PDD), the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$, the product of formula $CF_2=CFOCF_2CF_2SO_2F$, the product of formula $F(CF_2)_nCH_2OCF=CF_2$ in which n is 1, 2, 3, 4 or 5, the product of formula $R1CH_2OCF=CF_2$ in which R1 is hydrogen or $F(CF_2)_z$ and z has the value 1, 2, 3 or 4, the product of formula $R3OCF=CH_2$ in which R3 is $F(CF_2)_z$ and z has the value 1, 2, 3 or 4, or also perfluorobutylethylene (PFBE), fluorinated ethylene propylene (FEP), 3,3,3-trifluoropropene, 2-trifluoromethyl-3,3,3-trifluoro-1-propene, 2,3,3,3-tetrafluoropropene or HFO-1234yf, E-1,3,3,3-tetrafluoropropene or HFO-1234zeE, Z-1,3,3,3-tetrafluoropropene or HFO-1234zeZ, 1,1,2,3-tetrafluoropropene or HFO-1234yc, 1,2,3,3-tetrafluoropropene or HFO-1234ye, 1,1,3,3-tetrafluoropropene or HFO-1234zc, and chlorotetrafluoropropene or HCFO-1224.

According to one embodiment, the copolymer is a terpolymer.

According to another embodiment, said binder is a fluoropolymer carrying functional group(s) capable of developing adhesion to a metal substrate and good cohesion of the material making up the electrode. It can be a polymer based on VDF (containing at least 50 mol % of VDF) additionally comprising units carrying at least one of the following functional groups: carboxylic acid, carboxylic acid anhydride, carboxylic acid esters, epoxy groups (such as glycidyl), amide groups, alcohol groups, carbonyl groups, mercapto groups, sulfide, oxazoline groups and phenol groups. The functional group is introduced onto the fluoropolymer by a chemical reaction which can be grafting or a copolymerization of the fluoropolymer with a compound carrying at least one of said functional groups, according to techniques well known to a person skilled in the art.

According to one embodiment, the carboxylic acid functional group is a hydrophilic group of (meth)acrylic acid type chosen from acrylic acid, methacrylic acid, hydroxyethyl (meth)acrylate, hydroxypropyl (meth)acrylate and hydroxyethylhexyl (meth)acrylate.

According to one embodiment, the units carrying the carboxylic acid functional group additionally comprise a heteroatom chosen from oxygen, sulfur, nitrogen and phosphorus.

When the fluoropolymer is functionalized, the content of functional groups ensuring the adhesion of the binder to a metal is at least 0.05 mol % and preferably at least 0.15 mol %.

The metal supports of the electrodes are generally made of aluminum for the cathode and of copper for the anode.

Preparation of the Electrode

Another subject matter of the present invention is a process for the preparation of the electrode composite material described above, which comprises:

i) at least a stage of preparation of a suspension involving:
one or more organic salts of formula A and/or B;
an electron-conducting additive;

a polymer binder according to the invention;
one or more volatile solvents;
an electrode active material chosen from a lithium oxide, phosphate, fluorophosphate or silicate, and ii) a stage of preparation of a film starting from the suspension prepared in (i).

The suspension can be obtained by dispersion and homogenization by any mechanical means, for example using a rotor-stator or an anchor stirrer or by ultrasound.

The suspension can be prepared from the polymer in the pure state or in the form of a solution in one or more volatile solvent(s), from the organic salts in the pure state or in the form of a suspension in one or more volatile solvent(s), from the electron-conducting additive and from the active material in the pure state, optionally after a stage of drying at a temperature of between 50 and 150° C.

Preferably, the volatile solvent(s) is or are chosen from an organic solvent or water. Mention may in particular be made, as an organic solvent, of the organic solvents N-methylpyrrolidone (NMP) or dimethyl sulfoxide (DMSO).

The suspension can be prepared in a single stage or in two or three successive stages. When the suspension is prepared in two successive stages, one embodiment consists in preparing, in the first stage, a dispersion containing the solvent, the organic salt(s) and optionally all or part of the polymer binder, using mechanical means, and then, in a second stage, in adding the other constituents of the composite material to this first dispersion. The film is subsequently obtained from the suspension on conclusion of the second stage.

When the suspension is prepared in three successive stages, one embodiment consists in preparing, in the first stage, a dispersion containing the organic salt(s) and optionally all or part of the polymer binder in a solvent, and then, in the second stage, in adding the active material and removing the solvent, in order to obtain a powder, and subsequently in adding solvent and the remainder of the constituents of the composite material, in order to obtain a suspension. The film is subsequently obtained from the suspension on conclusion of the third stage.

The dissolution of the organic salts of formula A and/or B can be carried out at temperatures ranging from 0 to 150° C., preferably between 10 and 100° C.

In addition, a subject matter of the present invention is Li-ion batteries incorporating said material.

EXAMPLE 1: PROCESS FOR THE MANUFACTURE OF A CATHODE AND COMPOSITION OF A CATHODE ACCORDING TO THE INVENTION

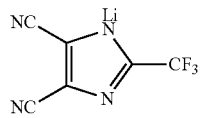

Stirring is carried out using a rotor-stator. 0.0197 g of LiTDI (formula above) is placed in a flask. Dissolution is carried out with 7.08 g of NMP (N-methylpyrrolidone) and the solution is left stirring at 25° C. for 10 min. 0.1974 g of binder according to the invention (chosen from the binders defined below) is added and the mixture is left stirring at 50° C. for 30 min. 0.1982 g of Super P carbon (Timcal®) is subsequently added and the mixture is left stirring for 2 h. Finally, 4.5567 g of LiMn$_2$O$_4$ and 2.52 g of NMP are added and the mixture is left stirring for 3 h. The suspension is subsequently spread in the form of a film with a thickness of 100 μm over a sheet of aluminum. The film is allowed to dry at 130° C. for 5 h.

Fluorinated Binders According to the Invention:

1a—Kynar® HSV900: PVDF homopolymer sold by Arkema France, with a melt viscosity of greater than 4000 Pa·s at 232° C. and 100 s$^{-1}$ 2a—Kynar® HSV500: PVDF homopolymer sold by Arkema France, with a melt viscosity of 3000 Pa·s at 232° C. and 100 s$^{-1}$ 3a—Kynarflex® LBG: Copolymer of VDF and HFP sold by Arkema France, with a melt viscosity of 3300 Pa·s at 232° C. and 100 s$^{-1}$ 4a—Kureha® 7200: PVDF homopolymer sold by Kureha, with a melt viscosity of greater than 2700 Pa·s at 232° C. and 100 s$^{-1}$ 5a—Solef® 5130: Functionalized PVDF sold by Solvay, with a melt viscosity of greater than 2700 Pa·s at 232° C. and 100 s$^{-1}$

EXAMPLE 2: PROCESS FOR THE MANUFACTURE OF A CATHODE AND COMPOSITION OF A CATHODE ACCORDING TO THE INVENTION

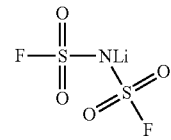

Stirring is carried out using a rotor-stator. 0.0183 g of LiFSI (formula above) is placed in a flask. Dissolution is carried out with 6.56 g of NMP (N-methylpyrrolidone) and the solution is left stirring at 25° C. for 10 min. 0.1831 g of binder according to the invention (chosen from the binders defined below) is added and the mixture is left stirring at 50° C. for 30 min. 0.1838 g of Super P carbon (Timcal®) is subsequently added and the mixture is left stirring for 2 h. Finally, 4.2257 g of LiNiMnCoO$_2$ (proportions of Ni, Mn and Co: 1/1/1) and 2.34 g of NMP are added and the mixture is left stirring for 3 h. The suspension is subsequently spread in the form of a film with a thickness of 100 μm over a sheet of aluminum. The film is allowed to dry at 130° C. for 4 h.

Fluorinated Binders According to the Invention:

1a—Kynar® HSV900: PVDF homopolymer sold by Arkema France, with a melt viscosity of greater than 4000 Pa·s at 232° C. and 100 s$^{-1}$ 2a—Kynar® HSV500: PVDF homopolymer sold by Arkema France, with a melt viscosity of 3000 Pa·s at 232° C. and 100 s$^{-1}$ 3a—Kynarflex® LBG: Copolymer of VDF and HFP sold by Arkema France, with a melt viscosity of 3300 Pa·s at 232° C. and 100 s$^{-1}$ 4a—Kureha® 7200: PVDF homopolymer sold by Kureha, with a melt viscosity of greater than 2700 Pa·s at 232° C. and 100 s$^{-1}$ 5a—Solef® 5130: Functionalized PVDF sold by Solvay, with a melt viscosity of greater than 2700 Pa·s at 232° C. and 100 s$^{-1}$

EXAMPLE 3: PROCESS FOR THE MANUFACTURE OF A CATHODE AND COMPOSITION OF A CATHODE ACCORDING TO THE INVENTION

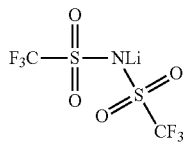

Stirring is carried out using a rotor-stator. 0.0203 g of LiTFSI (formula above) is placed in a flask. Dissolution is carried out with 7.30 g of NMP (N-methylpyrrolidone) and the solution is left stirring at 25° C. for 10 min. 0.2038 g of binder according to the invention (chosen from the binders defined below) is added and the mixture is left stirring at 50° C. for 30 min. 0.2046 g of Super P carbon (Timcal®) is subsequently added and the mixture is left stirring for 2 h. Finally, 4.7037 g of LiNiMnCoO$_2$ (proportions of Ni, Mn and Co: 5/3/2) and 2.60 g of NMP are added and the mixture is left stirring for 3 h. The suspension is subsequently spread in the form of a film with a thickness of 100 μm over a sheet of aluminum. The film is allowed to dry at 130° C. for 4 h.

Fluorinated Binders According to the Invention:

1a—Kynar® HSV900: PVDF homopolymer sold by Arkema France, with a melt viscosity of greater than 4000 Pa·s at 232° C. and 100 s$^{-1}$ 2a—Kynar® HSV500: PVDF homopolymer sold by Arkema France, with a melt viscosity of 3000 Pa·s at 232° C. and 100 s$^{-1}$ 3a—Kynarflex® LBG: Copolymer of VDF and HFP sold by Arkema France, with a melt viscosity of 3300 Pa·s at 232° C. and 100 s$^{-1}$ 4a—Kureha® 7200: PVDF homopolymer sold by Kureha, with a melt viscosity of greater than 2700 Pa·s at 232° C. and 100 s$^{-1}$ 5a—Solef® 5130: Functionalized PVDF sold by Solvay, with a melt viscosity of greater than 2700 Pa·s at 232° C. and 100 s$^{-1}$

EXAMPLE 4: PROCESS FOR THE MANUFACTURE OF A CATHODE AND COMPOSITION OF A CATHODE ACCORDING TO THE INVENTION

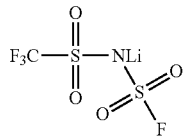

Stirring is carried out using a rotor-stator. 0.0201 g of LiFTFSI (formula above) is placed in a flask. Dissolution is carried out with 7.23 g of NMP (N-methylpyrrolidone) and the solution is left stirring at 25° C. for 10 min. 0.2016 g of binder according to the invention (chosen from the binders defined below) is added and the mixture is left stirring at 50° C. for 30 min. 0.2025 g of Super P carbon (Timcal®) is subsequently added and the mixture is left stirring for 2 h. Finally, 4.6547 g of LiCoO$_2$ and 2.57 g of NMP are added and the mixture is left stirring for 3 h. The suspension is subsequently spread in the form of a film with a thickness of 100 μm over a sheet of aluminum. The film is allowed to dry at 130° C. for 4 h.

Fluorinated Binders According to the Invention:

1a—Kynar® HSV900: PVDF homopolymer sold by Arkema France, with a melt viscosity of greater than 4000 Pa·s at 232° C. and 100 s$^{-1}$ 2a—Kynar® HSV500: PVDF homopolymer sold by Arkema France, with a melt viscosity of 3000 Pa·s at 232° C. and 100 s$^{-1}$ 3a—Kynarflex® LBG: Copolymer of VDF and HFP sold by Arkema France, with a melt viscosity of 3300 Pa·s at 232° C. and 100 s$^{-1}$ 4a—Kureha® 7200: PVDF homopolymer sold by Kureha, with a melt viscosity of greater than 2700 Pa·s at 232° C. and 100 s$^{-1}$ 5a—Solef® 5130: Functionalized PVDF sold by Solvay, with a melt viscosity of greater than 2700 Pa·s at 232° C. and 100 s$^{-1}$

EXAMPLE 5: PROCESS FOR THE MANUFACTURE OF A CATHODE AND COMPOSITION OF A CATHODE ACCORDING TO THE INVENTION

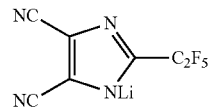

Stirring is carried out using a rotor-stator. 0.0182 g of LiPDI (formula above) is placed in a flask. Dissolution is carried out with 6.53 g of NMP (N-methylpyrrolidone) and the solution is left stirring at 25° C. for 10 min. 0.1821 g of binder according to the invention (chosen from the binders defined below) is added and the mixture is left stirring at 50° C. for 30 min. 0.1829 g of Super P carbon (Timcal®) is subsequently added and the mixture is left stirring for 2 h. Finally, 4.2045 g of LiFePO$_4$ and 2.32 g of NMP are added and the mixture is left stirring for 3 h. The suspension is subsequently spread in the form of a film with a thickness of 100 μm over a sheet of aluminum. The film is allowed to dry at 130° C. for 4 h.

Fluorinated Binders According to the Invention:

1a—Kynar® HSV900: PVDF homopolymer sold by Arkema France, with a melt viscosity of greater than 4000 Pa·s at 232° C. and 100 s$^{-1}$ 2a—Kynar® HSV500: PVDF homopolymer sold by Arkema France, with a melt viscosity of 3000 Pa·s at 232° C. and 100 s$^{-1}$ 3a—Kynarflex® LBG: Copolymer of VDF and HFP sold by Arkema France, with a melt viscosity of 3300 Pa·s at 232° C. and 100 s$^{-1}$ 4a—Kureha® 7200: PVDF homopolymer sold by Kureha, with a melt viscosity of greater than 2700 Pa·s at 232° C. and 100 s$^{-1}$ 5a—Solef® 5130: Functionalized PVDF sold by Solvay, with a melt viscosity of greater than 2700 Pa·s at 232° C. and 100 s$^{-1}$

The invention claimed is:

1. A battery electrode composite material comprising:
   a) at least one electron-conducting additive at a content ranging from 1 to 5% by weight, with respect to the total weight of the composite material;
   b) a lithium oxide, phosphate, fluorophosphate or silicate as electrode active material Capable of reversibly forming an insertion compound with lithium, having an electrochemical potential of greater than 2V with respect to the Li/Li$^+$ pair;
   c) a fluorinated polymer binder;
   d) at least one organic salt,
   wherein said organic salt exhibits the formula A:

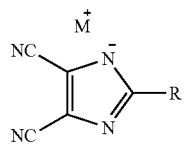

wherein R represents one or more of F, —CF$_3$ or —C$_2$F$_5$, and M$^+$ representing a lithium or sodium cation,
   and wherein said binder is a fluoropolymer having a melt viscosity of greater than or equal to 2000 Pa·s at 232 C under shearing of 100 s$^{-1}$ according to the standard ASTM D3825 and/or which carries functional group(s) capable of developing adhesion to a metal substrate.

2. The material as claimed in claim 1, wherein the ids of formula A are lithium imidazolates.

3. The material as claimed in claim 1, wherein the organic salt(s) represents between 0.01 and 10% by weight, with respect to the total weight of the material.

4. The material as claimed in claim 1, wherein said binder is a fluoropolymer selected from the group consisting of vinylidene fluoride and chlorotrifluoroethylene copolymers, and poly(vinylidene fluoride).

5. The material as claimed in claim 1, in which said binder is poly(vinylidene fluoride) (PVDF) having a melt viscosity of greater than or equal to 2000 Pa·s as measured at 232° C. under shearing of 100 s$^{-1}$ according to the standard ASTM D3825.

6. The material as claimed in claim 1, in which said binder is a PVDF carrying at least one functional group selected from the groups consisting of: carboxylic acid, carboxylic acid anhydride; carboxylic acid esters, epoxy groups, amide groups, alcohol groups, carbonyl groups, mercapto groups, sulfide, oxazoline groups and phenol groups.

7. The material as claimed in claim 6, in which the carboxylic acid functional group is chosen from acrylic acid, methacrylic acid, hydroxyethyl (meth)acrylate, hydroxypropyl (meth)acrylate and hydroxyethylhexyl (meth)acrylate.

8. The material as claimed in claim 5, in which the PVDF corresponds to vinylidene fluoride (VDF) homopolymers or copolymers of VDF and of at least one other comonomer in which the VDF represents at least 50 mol %, said comonomer being chosen from the group consisting of vinyl fluoride, trifluoroethylene, chlorotrifluoroethylene (CTFE), 1,2-difluoroethylene, tetrafluoroethylene (TFE), hexafluoropropylene (HFP), perfluoro(alkyl vinyl) ethers, perfluoro(methyl vinyl) ether (PMVE), perfluoro(ethyl vinyl) ether (PEVE), perfluoro(propyl vinyl) ether (PPVE), perfluoro(1,3-dioxole), perfluoro(2,2-dimethyl-1,3-dioxole) (PDD), the product of formula CF$_2$=CFOCF$_2$CF(CF$_3$)OCF$_2$CF$_2$X in which X is SO$_2$F, CO$_2$H, CH$_2$OH, CH$_2$OCN or CH$_2$OPO$_3$H, the product of formula CF$_2$=CFOCF$_2$CF$_2$SO$_2$F, the product of formula F(CF$_2$)$_n$CH$_2$OCF=CF$_2$ in which n is 1, 2, 3, 4 or 5, the product of formula R1CH$_2$OCF=CF$_2$ in which R1 is hydrogen or F(CF$_2$)$_z$ and z has the value 1, 2, 3 or 4, the product of formula R3OCF=CH$_2$ in which R3 is F(CF$_2$)$_z$ and z has the value 1, 2, 3 or 4, or also perfluorobutylethylene (PFBE), fluorinated ethylene propylene (FEP), 3,3,3-trifluoropropene, 2-trifluoromethyl-3,3,3-trifluoro-1-propene, 2,3,3,3-tetrafluoropropene (HFO-234yf), E-1,3,3,3-tetrafluoropropene (HFO-1234zeE), Z-1,3,3,3-tetrafluoropropene (HFO-1234zeZ), 1,1,2,3-tetrafluoropropene (HFO-1234yc), 1,2,3,3-tetrafluoropropene (HFO-1234ye), 1,1,3,3-tetrafluoropropene (HFO-1234zc), and chlorotetrafluoropropene (HCFO-1224).

9. The material as claimed in claim 1, wherein the electron-conducting additive is chosen from the different allotropic forms of carbon or conducting organic polymers.

10. A process for the preparation of the material as claimed in claim 1, wherein said process comprises (i) at least a stage of preparation of a suspension involving:
    one or more organic salts of formula A;
    an electron-conducting additive;
    a polymer binder wherein said binder is a fluoropolymer having a melt viscosity of greater than or equal to 2000 Pa·s at 232° C. under shearing of 100 s$^{-1}$ according to the standard ASTM D3825, chosen from vinylidene fluoride and chlorotrifluoroethylene copolymers, and poly(vinylidene fluoride);
    one or more volatile solvents;
    an electrode active material chosen from a lithium oxide, phosphate; fluorophosphate or silicate, and
    ii) a stage of preparation of a film starting from the suspension prepared in (i).

11. The process as claimed in claim 10, wherein the volatile solvent(s) is chosen from organic solvents and water.

12. The process as claimed in claim 11, wherein the organic solvents are chosen from N-methylpyrrolidone and dimethyl sulfoxide.

13. A Li-ion battery, comprising the material as claimed in claim 1.

14. The battery electrode composite material of claim 1, wherein said electrode composite material is a positive electrode material.

15. The material as claimed in claim 3 wherein the organic salt(s) represents between 0.05 and 5% by weight, with respect to the total weight of the material.

* * * * *